M. BENJAMIN.
BEARING FOR PULVERIZING MILLS.
APPLICATION FILED NOV. 30, 1908.

937,203.

Patented Oct. 19, 1909.
3 SHEETS—SHEET 1.

WITNESSES:

INVENTOR.

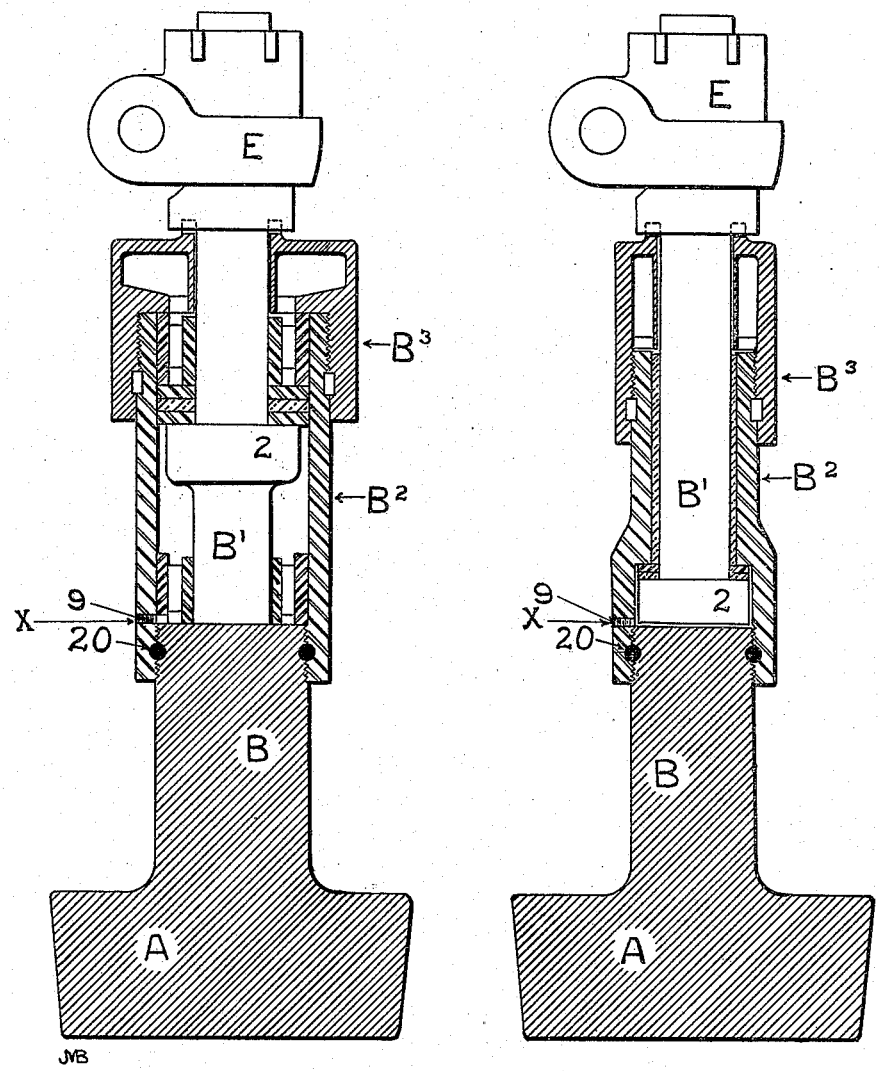

UNITED STATES PATENT OFFICE.

MORRIS BENJAMIN, OF ATLANTA, GEORGIA, ASSIGNOR TO BENJAMIN PULVERIZER CO., A CORPORATION OF NEW JERSEY.

BEARING FOR PULVERIZING-MILLS.

937,203.  Specification of Letters Patent.  Patented Oct. 19, 1909.

Application filed November 30, 1908. Serial No. 465,172.

*To all whom it may concern:*

Be it known that I, MORRIS BENJAMIN, a citizen of the United States, and residing at Atlanta, in the county of Fulton and State of Georgia, have invented certain new and useful Improvements in Bearings for Pulverizing-Mills, of which the following is a specification.

Figure 1:
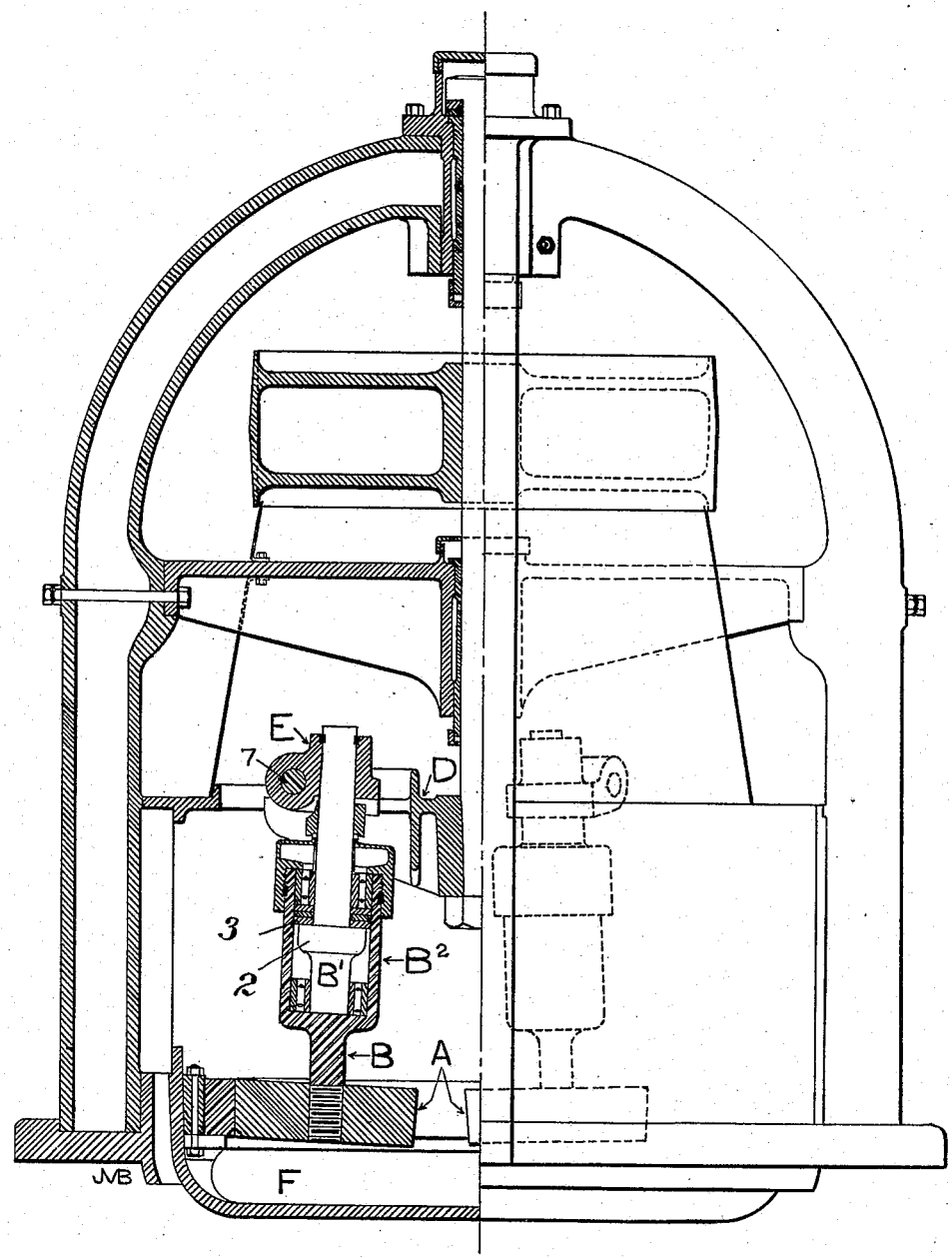
Figure 2:
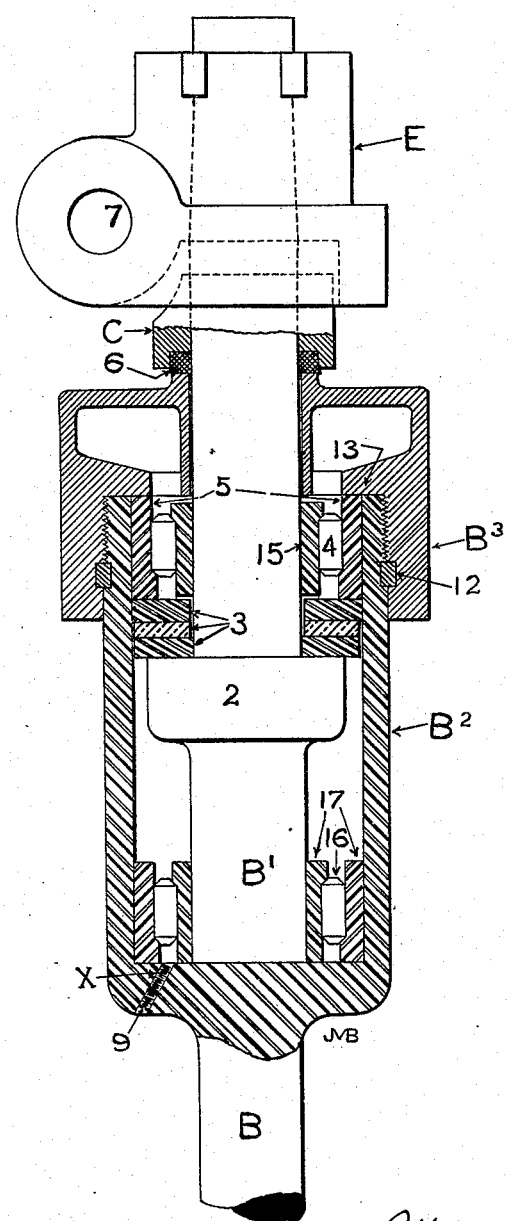

In that class of grinding mills in which crushing rollers are carried in a substantially circular path within a circular pan and are supported by swinging shafts, injury has resulted from the escape of oil in the bearings which are so arranged as to permit of a rotation of the crushing rollers upon or with the suspensory shaft, this injury resulting from the difficulty of making the packings of such a character as to prevent the dripping of oil from the oil receptacles or boxes onto the contents of the pan. In those cases where the roll revolves around a shaft arrangements may be made whereby to retain the lubricant, but this is objectionable because of the difficulty of ridding the bearing of the old lubricant and accumulations in the oil chamber, the heating of the lubricant which is in the hottest part of the mill resulting from the constant hammering and vibrations upon the roll, which heating sometimes in crystallizing the shaft causes it to break and wreck the mill. To overcome these objections I make the shaft practically in two parts one of which is suspended to swing from the cross-head while the other, axially in line with the first, supports the roll at its lower end, and with an intermediate box and bearing, as fully set forth hereinafter and as illustrated in the accompanying drawing, in which:

Figure 1 is a side elevation showing sufficient of a grinding mill to illustrate my improvement; Fig. 2 is an enlarged sectional elevation through the bearing box portion of the structure; Figs. 3 and 4 are modifications.

The mill is provided with the usual revolving cross-head D, the basin F, one or more crushing rollers A, and the shafts for supporting said rollers. There may be one or more shafts as desired and each shaft consists of two shaft sections B, B'. The upper shaft section B' is non-rotative and as shown is suspended from the hanger E which is provided with side trunnions 7 adapted to bearings in the cross-head and has, preferably, near the lower end, a bearing collar 2, while the lower section B, to which the crushing roller is connected has at the upper end a box $B^2$, open at the upper end only and provided with a bearing 3 which rests upon the bearing collar 2, so that the lower section of the shaft may rotate upon the bearing of the upper section.

As shown the bearing 3 is detachable and consists of a series of flat antifriction rings which are held in place by a hollow cylinder or ring 5, which in turn is confined by a detachable cap $B^3$ on the box $B^2$, which cap is securely held in place preferably by screwing on to the upper end of the box and then prevented from rotating by means of cross-keys 12, an inner flange 13 of the cap bearing upon the outer ring 5 and holding it in place. Preferably the ring 5 is of hard steel and a similar but smaller ring 15 surrounds the shaft section B' with intervening vertical antifriction rollers 4.

The collar 2 may be near the lower end of the shaft section B', but is preferably placed some distance above the lower end, and between the latter and the inner side of the box are placed antifriction cylinders or rollers 16 which travel between annular steel bearings 17.

The box $B^2$ not only incloses the bearings of the two shaft sections but constitutes an oil reservoir which contains the lubricant that fully covers all of the bearing faces and maintains them in a most effective condition, and while the position of the box and the inclosed bearings near the upper part of the apparatus aid in preserving the bearings free from the entrance of dust and grit, I prefer to fully close the box by means of a packing ring 6 which surrounds the upper shaft section B' and bears upon the top of the box and is confined in place by an annular gland C. This may be confined to the upper shaft section or, as shown, may slide thereon, bearing upon the packing by gravity.

As it is necessary from time to time to get rid of the spent oil the box is provided near its lower end with a duct $x$, closed by a plug 9. The box as shown is practically a part of the lower shaft section, but the two may be constructed separately and then secured immovably together if desired.

By the construction above described where the box is open only at the upper end the oil cannot possibly escape and is effectively maintained in contact with all the bearings; the box is absolutely closed against dust; the bearings are not subject to the hammer and vibrating action resulting when they are in or adjacent to the crushing roll so that there is but comparatively a slight heating of the bearings; the old oil can be drawn off at will, and the bearings are easily accessible.

The parts which I have referred to are not necessarily limited to the proportions and constructions shown in Figs. 1 and 2. For instance, as shown in both Figs. 3 and 4, the lower shaft section B may be short, practically only of sufficient length to permit the attachment of the casing or box $B^2$, forming in fact the main part of the shaft connected with the roller. In Fig. 3 the box $B^2$ is cylindrical throughout; in Fig. 4 it is contracted toward the upper end, and the bearing 2 is at the lower end of the shaft section B′, which is in such case inserted from the bottom, the box $B^2$ being then screwed on to the short section or hub B and secured by a suitable key 20 so that practically the section B and its box are continuous, and the oil chamber absolutely closed at the bottom end. It is also to be understood that this invention is not limited to a construction in which the cap $B^3$ is removable. This is especially true of the construction shown in Figs. 3 and 4 in which the shaft section B′ with its bearing 2 may be inserted from below and thereafter the section B secured to the box and the whole secured permanently together; that is the cap $B^3$ permanently secured to the body portion $B^2$. Such a construction comes within the scope of this invention.

Without limiting myself to the precise construction shown, I claim:

1. The combination with the revolving cross-head and crushing roller of a grinding mill, of a shaft having two sections axially in line, the lower section provided above the roller with a box connected fixedly to said section and permanently closed at the bottom and containing an annular bearing, and the upper section provided with a collar on which the said bearing rests.

2. The combination with the revolving cross-head and crushing roller of a grinding mill, of a shaft having two sections axially in line, the lower section provided above the roller with a box permanently closed at the bottom and containing an annular bearing, and the upper section provided with a collar on which the said bearing rests, and a detachable cap for the box constructed to hold said bearing in place.

3. The combination of the two shaft sections, the upper non-rotating, the lower rotatable, a crushing roller, a box fixedly secured to the lower section above the roller and closed at the bottom, a collar on the upper section, a detachable bearing for said collar within the box, and means for securing the bearing in place, the box having at the lower end a discharge duct and detachable plug closing the same, for the purpose set forth.

4. The combination with the two-part shaft of a grinding mill, of a roller carried at the lower end of the lower shaft section, a box above said roller, an antifriction bearing in said box, a collar on the upper shaft section on which said bearing rests, and antifriction rollers above said collar and between the side of the upper shaft section and the box.

5. The combination with the upper non-rotatable shaft section provided with a collar, the lower rotatable shaft section provided with a roller and with a box above the roller, fixedly secured to the lower section, closed at the bottom and provided with a bearing for the collar, and with a cap through which the upper section extends, a gland on the upper section above the cap, and a packing ring between the gland and the cap.

6. The combination of the rotatable cross-head, two shaft sections, the upper non-rotating and the lower rotating, a crushing roller carried by the lower section, a box fixedly connected with the lower section above the roller and closed at the bottom, a collar on the upper section, a bearing within the box for said collar, means for holding the said bearing in place, and a rocking hanger above the box supporting the upper shaft section and provided with trunnions.

In testimony whereof I affix my signature in presence of two witnesses.

MORRIS BENJAMIN.

Witnesses:
J. MALVERN BENJAMIN,
JOHN CLYDE MATTHEWS.